US011000845B2

(12) United States Patent
Ariga et al.

(10) Patent No.: US 11,000,845 B2
(45) Date of Patent: May 11, 2021

(54) PIPETTE TIP MOUNTING ADAPTOR

(71) Applicant: A&D COMPANY, LIMITED, Tokyo (JP)

(72) Inventors: Chika Ariga, Saitama (JP); Yuji Fukami, Saitama (JP); Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 164 days.

(21) Appl. No.: 16/328,602

(22) PCT Filed: Sep. 27, 2016

(86) PCT No.: PCT/JP2016/078357
§ 371 (c)(1),
(2) Date: Feb. 26, 2019

(87) PCT Pub. No.: WO2018/061072
PCT Pub. Date: Apr. 5, 2018

(65) Prior Publication Data
US 2020/0094243 A1 Mar. 26, 2020

(51) Int. Cl.
*B01L 3/02* (2006.01)
(52) U.S. Cl.
CPC ......... *B01L 3/0213* (2013.01); *B01L 2200/02* (2013.01); *B01L 2200/0689* (2013.01)
(58) Field of Classification Search
CPC ...... B01L 3/0213; B01L 3/0275; B01L 3/563; B01L 2200/02; B01L 2200/12;
(Continued)

(56) References Cited

U.S. PATENT DOCUMENTS 8,685,347 B2 *   4/2014  Kacian .............. H01L 21/67784
                                                         422/570
2002/0094302 A1 * 7/2002  Taggart ................ B01L 3/0275
                                                         422/525
(Continued)

FOREIGN PATENT DOCUMENTS

CN       201263823 Y  *  7/2009
JP         3064908 U       1/2000
(Continued)

OTHER PUBLICATIONS

International Search report issued in the corresponding Application No. PCT/JP2016/078357 dated Nov. 8, 2016.

*Primary Examiner* — Jill A Warden
*Assistant Examiner* — Henry H Nguyen
(74) *Attorney, Agent, or Firm* — Roberts Calderon Safran & Cole P.C.

(57) ABSTRACT

Operability, accuracy, and safety when fitting a glass-made pipette tip to a pipette are improved. A pipette tip fitting adapter includes a hollow body having one end portion configured to serve as a tip inserting portion into which a pipette tip is inserted, and the other end portion configured to serve as a pipette inserting portion into which a pipette is inserted, and at an opening side of an inner circumferential surface of the tip inserting portion, seal portions projecting inward are formed in a circumferential direction. Accordingly, a pipette tip that is long and heavy like a glass tip can be held.

5 Claims, 4 Drawing Sheets

(58) Field of Classification Search
CPC ......... B01L 2200/21; B01L 2200/0689; B01L 9/54; G01N 1/00
See application file for complete search history.

(56) References Cited

U.S. PATENT DOCUMENTS

| | | | |
|---|---|---|---|
| 2003/0223915 A1* | 12/2003 | Sagstetter | B01L 3/0293 422/512 |
| 2015/0099310 A1* | 4/2015 | Rasmussen | G01N 1/28 436/180 |
| 2016/0082430 A1 | 3/2016 | Izumo et al. | |

FOREIGN PATENT DOCUMENTS

| | | |
|---|---|---|
| JP | 2004-529746 A | 9/2004 |
| JP | 2012-503182 A | 2/2012 |
| JP | 2015-518571 A | 7/2015 |
| JP | 5791852 B2 | 10/2015 |
| WO | 2006/092942 A1 | 9/2006 |
| WO | WO-2006092942 A1 * | 9/2006 ............ B01L 3/0275 |

\* cited by examiner

PIPETTE TIP MOUNTING ADAPTOR

CROSS-REFERENCE TO RELATED APPLICATIONS

The present application is a U.S. National Phase of PCT/JP2016/078357 filed on Sep. 27, 2016. The disclosure of the PCT Application is hereby incorporated by reference into the present Application.

TECHNICAL FIELD

The present invention relates to an adapter for fitting a pipette tip to a pipette.

BACKGROUND ART

A manual or electric liquid dispenser (hereinafter, simply referred to as a pipette) handheld takes a volume change caused by a movement of a movable piston equipped inside the pipette as an air volume change, and sucks a volume of liquid corresponding to the air volume change into a pipette tip fitted to the pipette and discharges the liquid.

A pipette tip that is made of a resin such as polypropylene, and is disposable, is mainly used. However, there are various work scenes using pipettes, and in some cases such as analysis of endocrine disrupters, elution of chemical substances from plastic is a concern. In this case, by using a glass-made pipette tip, dispensing can be performed without concern for elution of chemical substances.

CITATION LIST

Patent Literature

Patent Literature 1: Japanese Published Unexamined Patent Application No. 2012-503182 (paragraph 0002)

SUMMARY OF THE INVENTION

Technical Problem

However, a tip attaching portion (tip fitting portion) of the pipette is made of a resin or metal, so that when a glass-made tip is attached, the tip is broken.

In addition, the glass-made tip is longer and heavier than a resin-made tip, so that attention must be paid to wobbling and falling during a dispensing operation. On the other hand, the pipette tip needs to be replaced according to a work, since the pipette needs to be easily inserted into and removed from a pipette main body.

The present invention was made in view of the problem in the conventional technology, and an object thereof is to provide a pipette tip fitting adapter for improvement in operability, accuracy, and safety when fitting a pipette tip to a pipette.

Solution to Problem

In order to solve the above-described problem, a pipette tip fitting adapter according to an aspect of the present invention includes a hollow body having one end portion configured to serve as a tip inserting portion into which a pipette tip is inserted, and the other end portion configured to serve as a pipette inserting portion into which a pipette is inserted, and at an opening side of an inner circumferential surface of the tip inserting portion, a seal portion projecting inward is formed in a circumferential direction.

In the aspect described above, it is also preferable that in a hollow portion of the hollow body, a cylindrical tip fixing portion extending to the tip inserting portion side is formed at an intermediate portion between the tip inserting portion and the pipette inserting portion.

In the aspect described above, it is also preferable that the tip fixing portion is formed to extend to the seal portion forming position.

In the aspect described above, it is also preferable that at an opening side of an inner circumferential surface of the pipette inserting portion, a serrated-shaped barb portion is formed in a circumferential direction.

In the aspect described above, it is also preferable that the pipette inserting portion has a plurality of cylindrical spaces in a pipette inserting direction, and the cylindrical spaces are formed so that their inner diameters become smaller toward the pipette inserting direction.

In the aspect described above, it is also preferable that, at an opening side of an inner circumferential surface of the pipette inserting portion, a serrated-shaped barb portion is formed in a circumferential direction, and the hollow body has, in a region in which the barb portion is formed, a thin portion formed to have a thickness thinner than a thickness of a region without the barb portion.

In the aspect described above, it is also preferable that a plurality of the seal portions are formed in a tip inserting direction, and fastening allowances of the plurality of seal portions are formed so as to become larger toward the opening side of the tip inserting portion.

Effect of the Invention

According to the pipette tip fitting adapter of the present invention, operability, accuracy, and safety when a pipette tip is fitted to a pipette can be improved.

DESCRIPTION OF EMBODIMENTS

Next, preferred embodiments of the present invention are described with reference to the drawings.

First Embodiment

Figure 1:
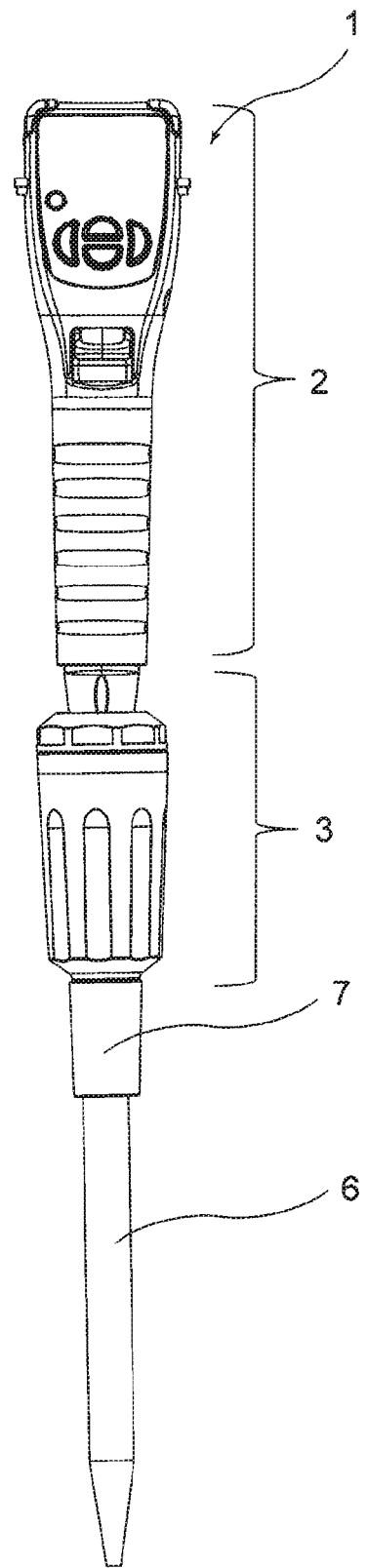
FIG. 1 is a front view of a pipette in a state where an adapter according to a first embodiment is fitted.
Figure 2:
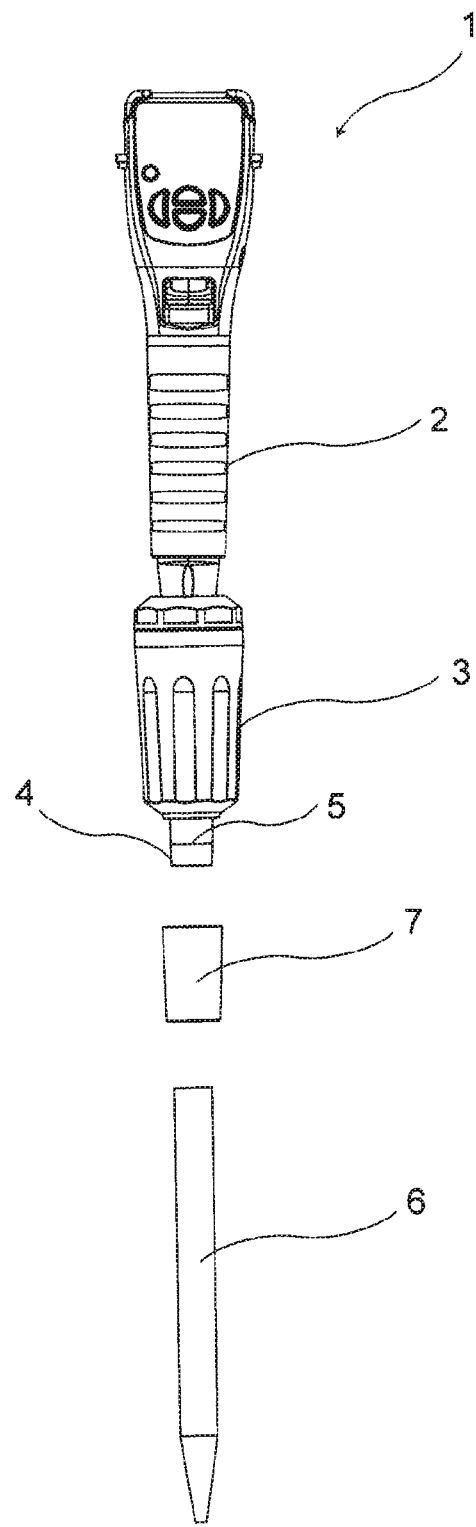
FIG. 2 is an exploded front view of the same pipette.

FIG. 1 is a front view of a pipette in a state where an adapter according to a first embodiment is fitted, and FIG. 2 is an exploded front view of the same pipette. The reference sign 1 denotes a pipette, the reference sign 7 denotes a pipette tip fitting adapter 7 (hereinafter, referred to as an adapter 7), and the reference sign 6 denotes a glass-made pipette tip (hereinafter, referred to as a glass tip 6). In the present description, the upper and lower sides are defined based on a state where the pipette tip is fitted to a pipette 1 (the state illustrated in FIG. 1).

The pipette 1, an electric pipette that can suck and discharge 10 ml is described by way of example. However, the pipette 1 may be a manual pipette, or may be a large-sized liquid dispenser that is not handheld. The pipette 1 includes a main body 2, and a tip holder 3 that is removably engaged with a lower side of the main body 2. The main body 2 houses a motor, and the tip holder 3 houses a movable piston and a cylinder. A lower end portion of the tip holder 3 is a fitting portion 4 (FIG. 2). At the fitting portion 4, an inclined portion 5 is formed. A general resin-made pipette tip is inserted in this fitting portion 4 and made to communicate with the cylinder, and is prevented from coming off by the inclined portion 5. However, the glass tip 6 is longer and heavier than a resin-made tip, and in glass molding, it is difficult to closely fit the glass tip 6 to the inclined portion 5, so that when the glass tip 6 is inserted into the fitting portion 4, (since the fitting portion 4 is mainly made of a hard resin or metal) the glass tip 6 may fall or be broken. The resin tip easily deforms and can be easily closely fitted to the fitting portion 4 and sealing performance can be obtained, however, in the case of the glass tip 6, it is difficult to realize close fitting and obtaining of sealing performance because the glass tip does not deform.

The adapter 7 communicates with the fitting portion 4 and holds the glass tip 6.

Figure 3:
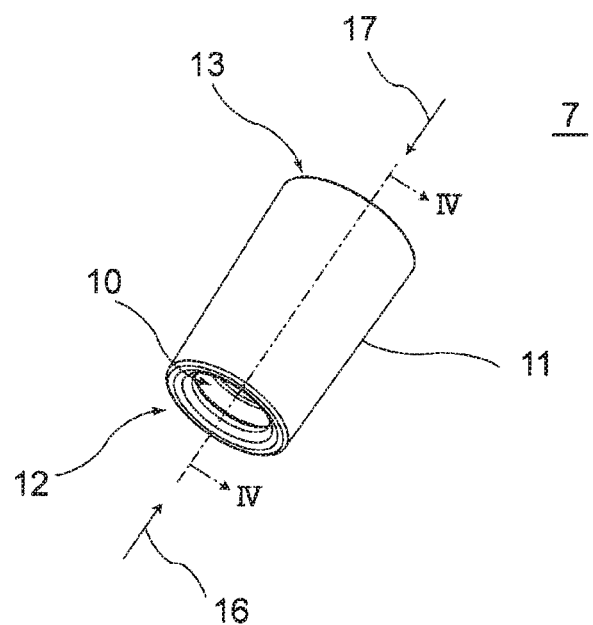
FIG. 3 is a perspective view of the adapter according to the first embodiment.
Figure 4:
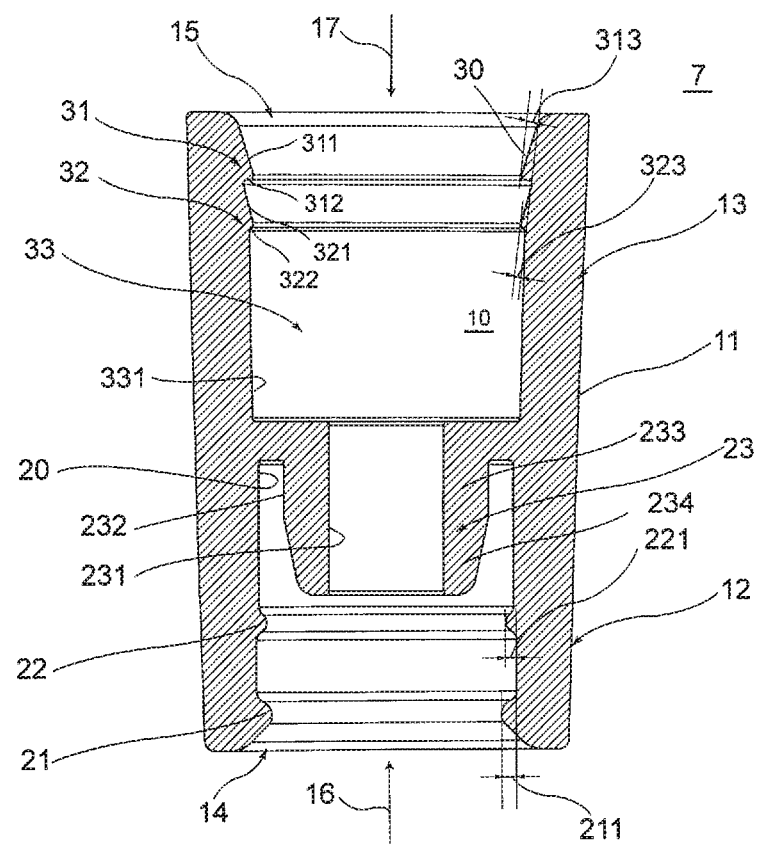
FIG. 4 is a cross sectional view of the adapter according to the first embodiment.

FIG. 3 is a perspective view of an adapter according to the first embodiment, and FIG. 4 is a cross sectional view (cross sectional view taken along line IV-IV in FIG. 3) of the adapter according to the first embodiment. The adapter 7 is formed of a columnar hollow body 11 having a hollow portion 10 penetrating in the up-down direction to form an airflow path between the cylinder and the glass tip 6. An external shape of the hollow body 11 is not limited to the columnar shape, and may be another shape. The hollow body 11 is formed of a resin with elasticity, for example, preferably, silicon rubber.

One end portion (lower end portion) of the hollow body 11 is a tip inserting portion 12 into which the glass tip 12 is inserted, and the other end portion (upper end portion) is a pipette inserting portion 13 into which the pipette 1 (fitting portion 4) is inserted. The glass tip 6 is inserted from a lower opening (hereinafter, referred to as a tip insertion opening 14), and the pipette 1 is inserted from an upper opening (hereinafter, referred to as a pipette insertion opening 15). The glass tip inserting direction is denoted by a reference sign 16, and the pipette inserting direction is denoted by a reference sign 17.

On a tip insertion opening 14 side of an inner circumferential surface 20 of the tip inserting portion 12, a first seal portion 21 and a second seal portion 22 are formed along a glass tip inserting direction 16. The first seal portion 21 and the second seal portion 22 are respectively annular ribs projecting inward in semispherical shapes, and are formed along the circumferential direction. A fastening allowance 211 (FIG. 4) of the first seal portion 21 positioned on the tip insertion opening 14 side is formed to be larger than a fastening allowance 221 (FIG. 4) of the second seal portion 22. The number of seal portions to be formed as described above is not limited to the number employed in the embodiment, and may be one or a larger plural number. When a plurality of seal portions are formed, their fastening allowances are formed so as to become larger toward the tip insertion opening 14 side.

In the hollow portion 10, at an intermediate position between the tip inserting portion 12 and the pipette inserting portion 13, a tip fixing portion 23 is formed. The tip fixing portion 23 extends horizontally inward from the inner circumferential surface 20 of the tip inserting portion, and from this extending portion, extends in a circular truncated cone shape to the tip insertion opening 14 side (downward). The cylindrical portion is a base end portion 233, and a portion having a taper so that an outer diameter narrows toward the tip insertion opening 14 is a free end portion 234. In the present embodiment, the free end portion 234 is formed to extend to a position on an inner side beyond the second seal portion 22. When the glass tip 6 is inserted into the tip inserting portion 12, the tip fixing portion 23 is inserted into the glass tip 6, and the glass tip 6 is held between an outer circumferential surface 232 of the tip fixing portion 23 and the inner circumferential surface 20 of the tip inserting portion. A space formed by an inner circumferential surface 231 of the tip fixing portion 23 serves as an airflow path.

On the other hand, on a pipette insertion opening side of an inner circumferential surface 30 of the pipette inserting portion 13, a first barb portion 31 and a second barb portion 32 are formed along a pipette inserting direction 17. The first barb portion 31 is serrated, and has a taper 311 narrowing inward at an inclination substantially parallel to the pipette inserting direction 17, and an inverse taper 312 that is formed continuously from the taper 311 and has an inclination substantially perpendicular to the pipette inserting direction 17. The taper 311 and the inverse taper 312 are formed along the circumferential direction. The second barb portion 32 is also serrated, and a taper 321 and an inverse taper 322 having the same shapes are formed along the circumferential direction. The number of barb portions to be formed as described above is not limited to the number employed in the embodiment, and may be one or a larger plural number.

The pipette inserting portion 13 has a cylindrical space 33 at an inner side beyond the second barb portion 32. An inner circumferential surface 331 of the cylindrical space 33 interferes with an outer circumferential surface of the fitting portion 4.

According to the adapter 7 having the above-described elements, in the tip inserting portion 12, by line contact by the first seal portion 21 and the second seal portion 22 and surface contact by the tip fixing portion 23, in a state where airtightness of the inside of the tip inserting portion 12 is secured, the glass tip 6 can be held in the tip inserting portion 12. The adapter 7 has elasticity, and the tip fixing portion 23 easily warps inward due to the taper of the free end portion 234, so that the glass tip 6 can be easily inserted and removed.

Since the tip fixing portion 23 is formed, wobbling of the glass tip 6 can be suppressed. In molding, the outer diameter of the glass tip 6 is higher in accuracy than the inner diameter, so that it is better to secure airtightness at the outer circumferential surface of the glass tip 6. Since the tip fixing portion 23 is formed, an upper end portion of the glass tip 6 is sandwiched between the outer circumferential surface 232 of the tip fixing portion 23 (base end portion 233) and the inner circumferential surface 20 of the tip inserting portion, so that the outer circumferential surface of the glass tip 6 is sealed by line contact with the first seal portion 21 and the second seal portion 22. Backlash of the glass tip 6 caused by sealing of the outer diameter of the tip is absorbed by elasticity of the tip fixing portion 23 on the inner diameter side of the tip.

The glass tip 6 is harder than the adapter 7, so that when the glass tip 6 is inserted into the tip inserting portion 12, the tip insertion opening 14 side slightly widens outward. On the other hand, the fastening allowance 211 of the first seal portion 21 is formed to be larger (higher) than the fastening allowance 221 of the second seal portion 22, so that even if the tip insertion opening 14 widens, the first seal portion 21 does not separate from but interferes with the outer circumferential surface of the glass tip 6. Therefore, sealing performance can be improved even at the time of deformation.

On the other hand, in the pipette inserting portion 13, by line contact by the first barb portion 31 and the second barb portion 32 and surface contact of the cylindrical space 33, in a state where airtightness inside the pipette inserting portion 13 is secured, the pipette 1 (fitting portion 4) can be held in the pipette inserting portion 13.

In the pipette inserting portion 13, since the cylindrical space 33 is formed, the outer circumferential surface of the fitting portion 4 comes into wide surface contact with the inner circumferential surface 331 of the cylindrical space 33. That is, due to formation of the cylindrical space 33, a contact area in the pipette inserting portion 13 is secured to be wider than a contact area in the tip inserting portion 12, so that the pipette inserting portion 13 has a higher holding force than the tip inserting portion 12. Therefore, even when the glass tip 6 is removed or a liquid weight is loaded on the glass tip 6, a holding force that is capable of withstanding a fall can be secured.

Further, while the first barb portion 31 and the second barb portion 32 make insertion of the pipette 1 by the tapers 311 and 321 easy, the first barb portion 31 and the second barb portion 32 interfere with the fitting portion 4 at the inverse tapers 312 and 322 and function to prevent coming off.

In order to improve the above-described effect of preventing coming off, a barb height 313 (FIG. 4) of the first barb portion 31 on the pipette insertion opening 15 side is preferably formed to be higher than a barb height 323 (FIG. 4) of the second barb portion 32 on the inner side beyond the first barb portion. The pipette insertion opening is tapered so that its diameter narrows toward the pipette inserting direction 17. To hold the fitting portion 4, the barb portion 31 must be formed to be higher than the barb portion 32 to fill a gap caused by the taper, and a holding force must be secured by a further sufficient fastening allowance.

As described above, according to the adapter 7, easy insertion and removal can be performed in the glass tip 6 side, and the pipette 1 side makes removal more difficult than at the glass tip 6 side, so that operability and safety when using the glass tip 6 are improved. In addition, both of the tip inserting portion 12 side and the pipette inserting portion 13 side are sufficiently sealed to be airtight, so that accuracy of a dispensing amount can also be maintained.

Second Embodiment

In a second embodiment, for the same element as in the first embodiment, the same reference sign is used, and description thereof is omitted. The pipette 1 of the first embodiment is for 10 ml, however, the pipette 1 is normally developed with many variations of capacity, and besides this, for example, there are pipettes for smaller amounts of 200 μl and 1200 μl. The pipettes 1 for 200 μl and 1200 μl have smaller diameters at fitting portions 4 than the pipette for 10 ml, respectively. The adapter 7 according to the second embodiment is formed so that the same adapter can adapt to different kinds of pipettes 1 (different diameters of the fitting portion 4).

Figure 5:
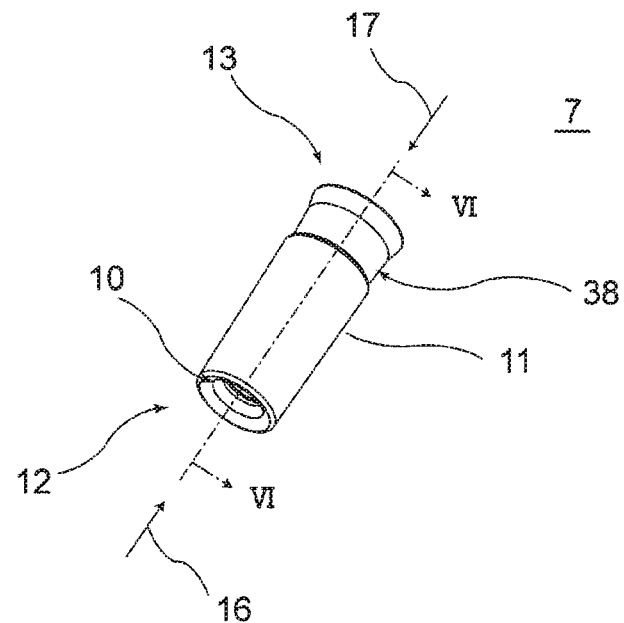
FIG. 5 is a perspective view of an adapter according to a second embodiment.
Figure 6:
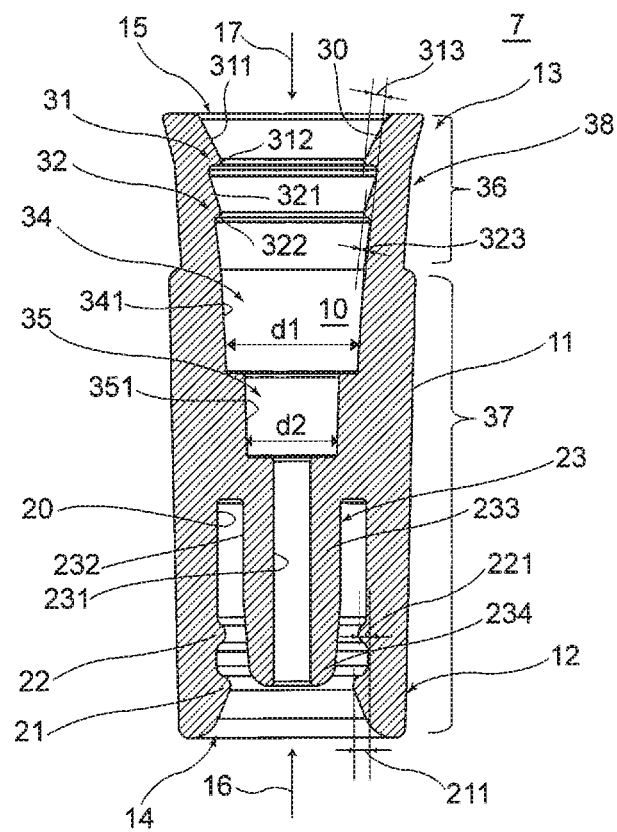
FIG. 6 is a cross sectional view of the adapter according to the second embodiment.

FIG. 5 is a perspective view of the adapter according to the second embodiment, and FIG. 6 is a cross sectional view of the adapter according to the second embodiment. The adapter 7 of the second embodiment also includes the substantially columnar hollow body 11 having the hollow portion 10, the tip inserting portion 12, and the pipette inserting portion 13.

On the tip insertion opening 14 side of the inner circumferential surface 20 of the tip inserting portion 12, the first seal portion 21 and the second seal portion 22 are formed along a glass tip inserting direction 16. The fastening allowance 211 is formed to be larger than the fastening allowance 221.

At an intermediate portion between the tip inserting portion 12 and the pipette inserting portion 13, the tip fixing portion 23 is formed. As in the first embodiment, when the glass tip 6 is inserted into the tip inserting portion 12, the tip fixing portion 23 is inserted into the glass tip 6, and the glass tip 6 is fixed by the outer circumferential surface 232 of the tip fixing portion 23 and the inner circumferential surface 20 of the tip inserting portion.

In the present embodiment, the tip fixing portion 23 has the free end portion 234 formed to extend to a position at which the first seal portion 21 is formed. The adapter 7 of the present embodiment is for a pipette with a smaller capacity compared with the first embodiment, so that the diameters of the tip insertion opening 14 and the pipette insertion opening 15 are close to each other in terms of width, and erroneous insertion may occur. By forming the tip fixing portion 23 so as to extend to a position at which the first seal portion 21 is formed, the tip fixing portion 23 can be viewed from the tip insertion opening 14, and the tip insertion opening 14 and the pipette insertion opening 15 can be easily distinguished from each other. In addition, even if the fitting portion 4 is inserted into the tip insertion opening 14, the tip fixing portion 23 interferes with the fitting portion 4, and the fitting portion 4 cannot be inserted into an inner side beyond the first seal portion 21, so that erroneous insertion can be noticed. Therefore, deformation of the adapter and accuracy deterioration due to erroneous insertion can be prevented.

On the other hand, on the pipette insertion opening 15 side of the inner circumferential surface 30 of the pipette inserting portion 13, the serrated-shaped first and second barb portions 31 and 32 are formed along the pipette inserting direction 17. As in the first embodiment, tapers 311 and 321 and inverse tapers 312 and 322 are formed.

The pipette inserting portion 13 of the second embodiment has a first cylindrical space 34 and a second cylindrical space 35 along the pipette inserting direction 17 at an inner side beyond the second barb portion 32. The first cylindrical space 34 and the second cylindrical space 35 are continuously formed, and an inner diameter d2 of the second cylindrical space 35 is formed to be smaller than an inner diameter d1 of the first cylindrical space 34. The inner circumferential surface 341 of the first cylindrical space 34 is designed so as to interfere with an outer circumferential surface of the fitting portion 4 of the pipette 1 for 1200 μl, and the inner circumferential surface 351 of the second cylindrical space 35 is designed so as to interfere with an outer circumferential surface of the fitting portion 4 of the pipette 1 for 200 μl. The number of cylindrical spaces described above is not limited to the number employed in the embodiment, and may be a larger plural number.

On the hollow body 11 of the second embodiment, a thin portion 38 is formed so that a member thickness of a barb portion forming region 36 in which the first barb portion 31 and the second barb portion 32 are formed becomes thinner than a member thickness of a region 37 without the barb portions 31 and 32.

According to the adapter 7 of the second embodiment including the elements described above, in the tip inserting portion 12, as in the first embodiment, the glass tip 6 can be held in an airtight state, and can be prevented from wobbling.

In the pipette inserting portion 13 of the second embodiment, in the case of the pipette 1 for 200 μl, the second cylindrical space 35 comes into surface contact with, and in the case of the pipette 1 for 1200 μl, the first cylindrical space 34 comes into surface contact with the outer circumferential surface of the fitting portion 4. That is, one adapter 7 can be used in common with a plurality of kinds of pipettes 1 with different tip end diameters.

Further, since the thin portion 38 is formed in the barb portion forming region 36, it is difficult for the pipette insertion opening 15 to widen outward compared with the first embodiment. Accordingly, even when the pipette 1 for 200 μl that has the smallest diameter is inserted (even when used at the position of the second cylindrical space 35), the thin portion 38 interferes with the fitting portion 4, so that a holding force can be maintained.

As above, embodiments and various modifications of a preferred pipette tip fitting adapter of the present invention are described, and each embodiment and each modification can be combined based on knowledge of a person skilled in the art, and such a combined mode is also included in the scope of the present invention. In addition, the present invention is used not only for a glass tip, but may also be used for a pipette tip made of other materials where there is a fear of wobbling or falling.

REFERENCE SIGNS LIST

1 Pipette
4 Fitting portion
6 Glass tip
7 Adapter
10 Hollow portion
11 Hollow body
12 Tip inserting portion
13 Pipette inserting portion
14 Tip insertion opening (opening)
15 Pipette insertion opening (opening)
16 Tip inserting direction
17 Pipette inserting direction
20 Inner circumferential surface of tip inserting portion
21 First seal portion
211 Fastening allowance of first seal portion
22 Second seal portion
221 Fastening allowance of second seal portion
23 Tip fixing portion
30 Inner circumferential surface of pipette insertion opening
31 First barb portion
32 Second barb portion
33, 34, 35 Cylindrical space
331 Inner circumferential surface of space
36 Barb portion forming region
37 Region without barb portions
38 Thin portion

The invention claimed is:

1. A pipette tip fitting adapter comprising:
a hollow body having one end portion and another end portion, the one end portion being a tip inserting opening into which a pipette tip is inserted, the other end portion being a pipette inserting opening into which a pipette is inserted,
an intermediate portion of the hollow body between the tip inserting opening and the pipette inserting opening,
a tip inserting portion that is a portion of the hollow body between the tip inserting opening to the intermediate portion, and
a pipette inserting portion that is a portion of the hollow body between the pipette inserting opening to the intermediate portion,
wherein at an inner circumferential surface of the tip inserting portion, a plurality of seal portions each projecting inward are formed in a circumferential direction, and all of the plurality of seal portions are formed on a half area of the circumferential surface of the tip inserting portion defined between the tip inserting opening and a midpoint of the inner circumferential surface along a tip inserting direction, and at the intermediate portion, a tip fixing portion having a cylindrical shape extending to the tip inserting opening side is formed to a position not extending into the half area,
wherein an outer circumferential surface of the tip fixing portion and the inner circumferential surface of the tip inserting portion are configured to engage a tubular end of the pipette tip therebetween.

2. The pipette tip fitting adapter according to claim 1, wherein at the pipette inserting opening side of an inner circumferential surface of the pipette inserting portion, a serrated-shaped barb portion is formed in a circumferential direction.

3. The pipette tip fitting adapter according to claim 1, wherein the pipette inserting portion has a plurality of cylindrical spaces in a pipette inserting direction, and the cylindrical spaces are formed so that inner diameters of the cylindrical spaces become smaller toward the pipette inserting direction.

4. The pipette tip fitting adapter according to claim 1, wherein at an the pipette inserting opening side of an inner circumferential surface of the pipette inserting portion, a serrated-shaped barb portion is formed in a circumferential direction, and the hollow body has, in a region in which the barb portion is formed, a thin portion formed to have a thickness thinner than a thickness of a region without the barb portion.

5. The pipette tip fitting adapter according to claim 1, wherein the plurality of the seal portions are formed in the tip inserting direction, and fastening allowances of the plurality of seal portions are formed so as to become larger toward the opening side of the tip inserting portion.

* * * * *